US006820661B1

(12) United States Patent
Heimert

(10) Patent No.: US 6,820,661 B1
(45) Date of Patent: Nov. 23, 2004

(54) SOLID CONCENTRATES DISSOLVER SYSTEM

(75) Inventor: Albert C. Heimert, Libertyville, IL (US)

(73) Assignee: AP Tech Group, Inc., Cincinnati, OH (US)

( * ) Notice: Subject to any disclaimer, the term of this patent is extended or adjusted under 35 U.S.C. 154(b) by 0 days.

(21) Appl. No.: 10/627,294

(22) Filed: Jul. 28, 2003

(51) Int. Cl.[7] .................................................. B64B 1/04
(52) U.S. Cl. ........................... 141/198; 141/9; 141/100; 222/67; 239/302
(58) Field of Search .............................. 141/9, 100, 67, 141/198, 95; 239/302, 325, 336, 543, 545, 548; 4/226.1, 227.1; 222/67

(56) References Cited

U.S. PATENT DOCUMENTS 1,681,362 A * 8/1928 Pike ........................... 422/282
3,574,561 A * 4/1971 Nickerson ................... 422/106
5,404,594 A * 4/1995 Ring et al. ..................... 4/224

* cited by examiner

*Primary Examiner*—Steven O. Douglas
(74) *Attorney, Agent, or Firm*—Gregory B. Beggs

(57) ABSTRACT

A solid chemical dissolver for making liquid solutions from solid chemicals packed in small containers is disclosed. The solutions are used for cleaning tanks, boilers, cooling towers and similar equipment internally. The dissolver has at least one bowl for receiving and holding one or more of the small containers of solid chemical. A spray nozzle aimed at the solid chemical directs fluid under pressure at the chemical to dissolve some of it and form a cleaning solution. A reservoir is provided to hold the solution prior to use, and a drain member leading away from the reservoir is provided for withdrawing the solution and using it to clean the tanks or other equipment. A fluid level detection switch assembly is disposed in the reservoir to control the amount of fluid from the nozzle and the level of the solution in the reservoir. Various embodiments of the invention are disclosed.

15 Claims, 6 Drawing Sheets

SOLID CONCENTRATES DISSOLVER SYSTEM

FIELD OF THE INVENTION

This invention relates to systems for dissolving solid chemical concentrates to make solutions for cleaning tanks, boilers, cooling towers and similar equipment internally. Mineral deposits and scale due to evaporation and corrosion are formed on the insides of the walls of such equipment during the time it is in service and must be removed. More particularly, this invention relates to a simplified mechanical system for dissolving solid concentrates and storing the resulting solutions in a reservoir in the quantities needed for circulation through the equipment to be cleaned. When the stored quantities are drawn off, a further supply of concentrate solution is readily made and obtained.

BACKGROUND OF THE INVENTION

Various kinds of apparatus for supplying concentrated chemical products in solutions to combat scale or corrosion have appeared recently. For example, in U.S. Pat. No. 6,105,638, issued Aug. 22, 2000, and in its predecessor, U.S. Pat. No. 5,853,034, issued Dec. 29, 1998, containers on which pierceable caps may be fastened are partly filled with concentrated chemicals. A diluent, such as water, is added in a sufficient amount to create a desired use dilution. The cap is placed on the container, and the container and its contents are agitated. Thereafter, the container is upended onto a dispenser with a piercing head. The head punctures the cap, forming an aperture in the container and enters to withdraw the use dilution for circulation in a cooling tower or the like.

A different apparatus is illustrated and described in U.S. Pat. No. 5,213,694, issued May 25, 1993. In the system shown in that patent, when make-up water is added to a cooling tower, a float valve in the tower controls the level of water in the tower. Chemical additives are added to the water entering the tank by having a vacuum valve draw them from a chemical holding tank.

Another system is illustrated and described in U.S. Pat. No. 6,418,958 B1, issued Jul. 16, 2002. That patent is directed to a chemical feed system which has spray nozzles directed upwardly into a pair of feed bowls into which solid chemicals have been poured. The bowls measure the conductivity of the chemicals which they dispense. When water is introduced into the bowls by the sprays, the bowls drain into a sump in which the conductivity of the solution is constantly monitored. The system is arranged to maintain a solution of constant conductivity in the sump, and when more water is needed in the sump to reduce conductivity, it is introduced by a separate piping system independently of the sprays so as to avoid contact with the chemicals.

The systems illustrated in these patents reveal numerous drawbacks, especially in the manner of introducing chemicals into their respective systems. The containers used to hold the chemicals in transit are often large and unwieldy, and when the chemicals are removed or drawn from them, spills and other handling accidents often occur. The present invention addresses these problems by providing equipment which is simply constructed, clearly organized, and easily accommodates small canisters of solid concentrates which are safe and convenient for an operator or a shipper to handle. Such containers are lightweight, compact, readily installed, easy to store and convenient to dispose of when they are empty. The new dissolver disclosed herein accommodates them readily and quickly, and it produces proper treatment solutions almost immediately when the containers are set in place. The solid concentrates which the equipment handles also produce large quantities of treatment solutions in a highly economical manner.

SUMMARY OF THE INVENTION

The present invention is embodied in a solid chemical dissolver unit which comprises at least one bowl for receiving and holding at least one container of solid chemical and for channeling a liquid solution containing the chemical to a reservoir as the solid chemical in the container is dissolved in a liquid spray. A spray nozzle for fluid under pressure is aimed at the solid chemical in the container to dissolve a portion of the chemical in the spray and form a solution containing the chemical in the bowl. A reservoir is provided for the dissolved chemical solution. A drain member leads out of the reservoir for withdrawing the dissolved chemical solution from the reservoir. There is also a fluid level detection switch assembly disposed in the reservoir controlling the amount of fluid from the nozzle and the level of dissolved chemical solution in the reservoir.

From the foregoing, and from what follows, it will be apparent that the present invention solves numerous problems which operators of tanks, boilers, cooling towers and similar equipment have had.

Accordingly, it is an object of this invention to provide a solid chemical dissolver which accepts small quantities of solid chemicals in containers which are easily handled by one person.

It is another object of this invention to provide a solid chemical dissolver which is easily loaded with a quantity of solid chemical without removing the chemical from its conventional container, such as the pail or jar in which it is shipped or stored.

It is a further object of this invention to provide a solid chemical dissolver which accepts small quantities of solid chemicals which can be handled without spills or other accidents which faulty handling can cause.

It is a further object of this invention to provide a bowl in which a small container, or group of small containers, which has or have been opened may be easily upended in the bowl and a solution obtained by spraying the solid chemical at an open end of a container.

Other objects and features of this invention will be apparent to those skilled in the art of making equipment for forming and dispensing solutions which combat corrosion and scale in equipment such as boilers and cooling towers from an examination of the following detailed description of preferred embodiments of this invention and of the accompanying drawings.

DESCRIPTION OF THE PREFERRED EMBODIMENTS

The preferred embodiments of this invention shown in the accompanying drawings will now be described, it being understood that the preferred forms are illustrative and that the invention described herein is embodied in the claims appended hereto.

Figure 1:
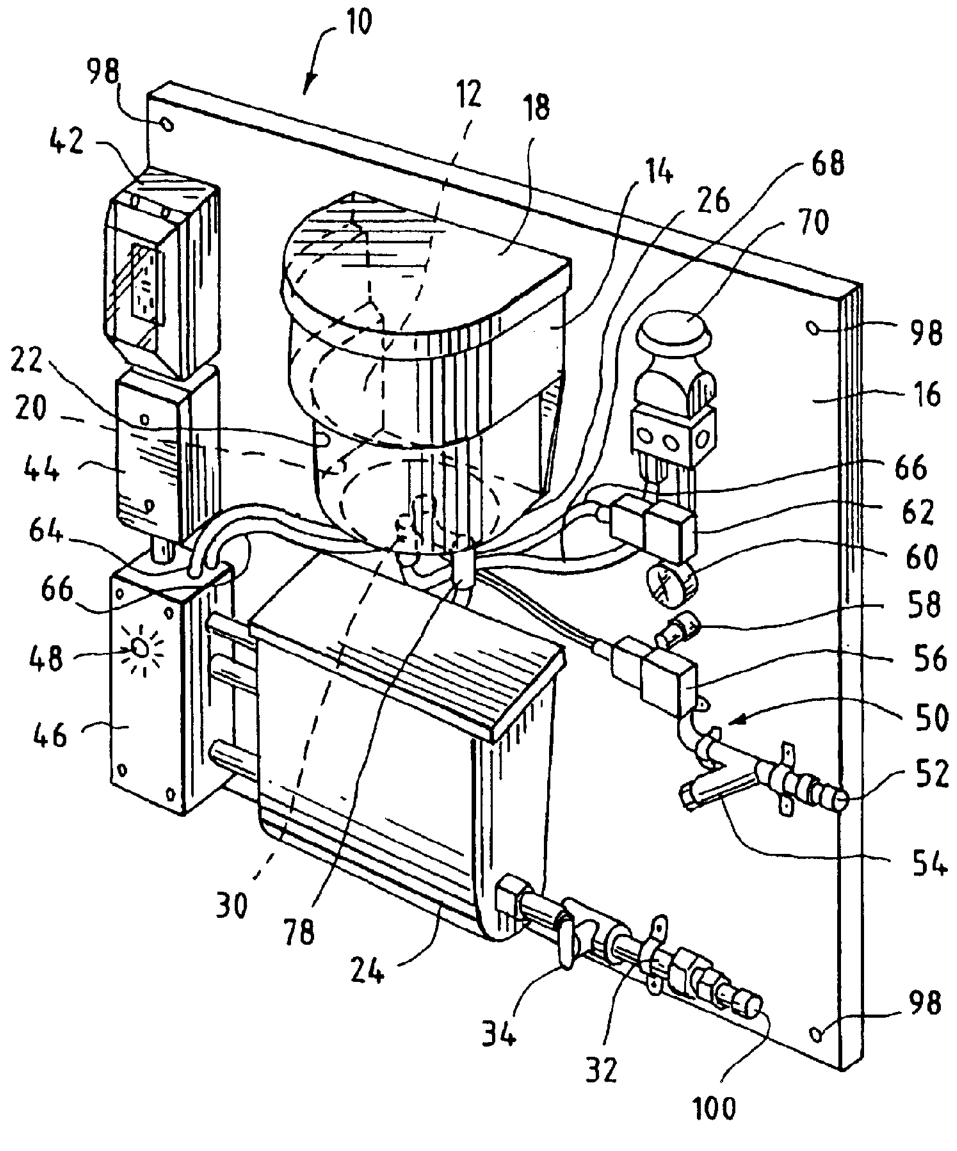
FIG. 1 is a perspective view of one form of a solid chemical dissolver embodying the present invention illustrating a bowl and its associated elements for receiving a container of solid chemical and dissolving the solid chemical with a spray.
Figure 2:
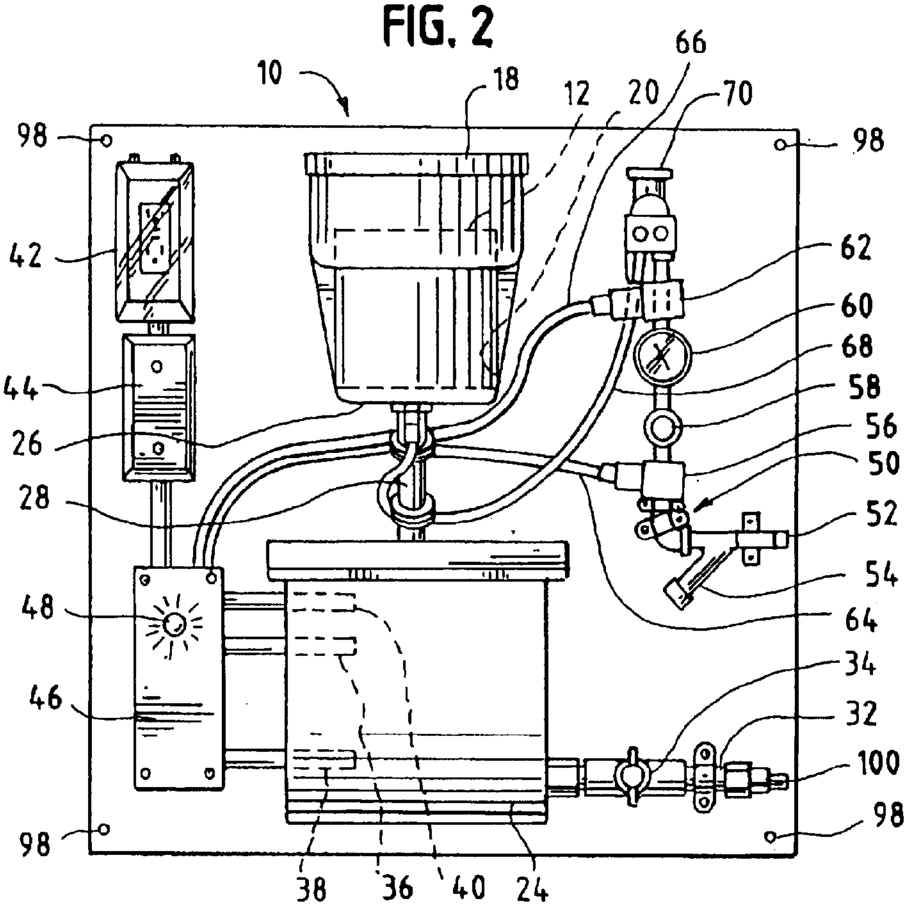
FIG. 2 is an elevational view of the solid chemical dissolver in FIG. 1.

The dissolver 10 illustrated in FIGS. 1 and 2 is arranged to receive a small pail 12 or similar container (such as a jar) of solid concentrated chemical. An example of such a container is a plastic pail weighing approximately twelve and one-half pounds, including contents. Other similar container sizes may be used. A bowl 14 mounted on a frame such as board 16 forms a receptacle for the solid concentrate container 12. One convenient size for the board to be is about twenty-four inches square. Bowl 14 may be provided with a lid 18 as shown in FIGS. 1 and 2 if the container 12 is small enough to fit wholly inside the bowl. However, if the container is too tall, as container 12*a* is in FIG. 2A, or if no cover for the bowl is desired for some other reason, an open bowl 14*a* without a lid may be used.

If the solid concentrate pail or container 12 is received by a user with a lid or some other form of cover over the solid concentrate, that cover is removed before the concentrate is used in dissolver 10. When such a cover is removed, and the solid concentrate exposed, the pail or container is inverted so that its open end, and the exposed solid concentrate, face downwardly. The open end of the pail or container is seated in the bowl near the bottom, which may be accomplished by wedging the rim edges 20 of the container at the container's open end against the inner walls of the bowl 12 near the bottom of the bowl, or by resting the rim edges 20*a* of the container 12*a* on a grate in the bottom of the bowl (not shown) or by a similar easily accomplished engagement which essentially involves a careful setting of the open end of the solid concentrate pail or container in the bowl.

Figure 2A:
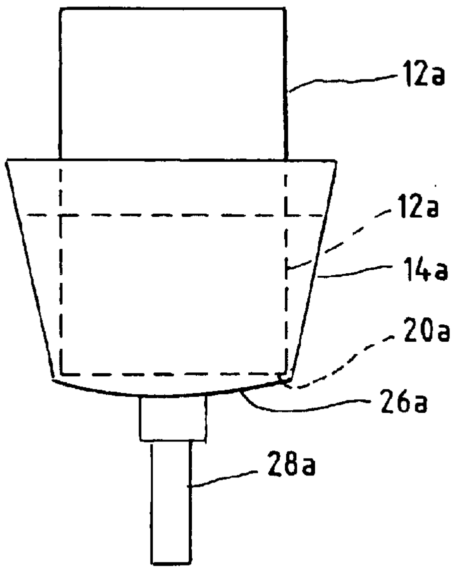
FIG. 2A is an enlarged elevational view of an alternative form of a portion of the chemical dissolver in FIG. 2.

A reservoir 24 is also mounted on board 16, connected to the bottom 26 of bowl 14 by bowl discharge piping 28. An identical connection is shown in FIG. 2A between bowl bottom 26*a* and discharge piping 28*a*. A nozzle 30 for a fluid such as water under pressure, preferably disposed at about 120 degrees, is connected to the bottom 26 of the bowl 14 and aimed at the open surface of the solid concentrate in container 12. When a spray from the nozzle 30 washes the face of the solid concentrate, the resulting solution drains downwardly through piping 28 into reservoir 24. Toward the bottom of reservoir 24, discharge piping 32 provides an outlet to drain the contents of the reservoir to a pump, shortly to be described. There is a valve 34 disposed in the discharge pipe 32 to close or open that pipe and let the reservoir 24 be drained. When the chemical solution is withdrawn from the reservoir, the pump circulates it to a cooling tower or similar equipment needing treatment (See FIG. 3).

Inside reservoir 24 there is a fluid level detection and control system which includes first and second float switches 36 and 38, respectively, and also a high fluid level indicator system which includes float switch 40. Float switch 38 controls fluid input to nozzle 30 and thus directs fluid to enter bowl 14, as will be explained momentarily, while float switch 36 controls cutting off fluid input, which will also be explained momentarily. Float switch 40 overrides all other fluid input and directs such input to stop whenever the fluid level in the reservoir 24 gets too high. Float switch 40 also activates a warning light 48 to tell an operator that the fluid level in the reservoir has gotten too high.

A power input cord (not shown) is connected to the dissolver 10 at the input connector terminal 42. Normally, a 120 volt power input brings local power to the site of the dissolver installation. However, in order to operate the relays and switches in the dissolver system, a 120 volt AC to 24 volt AC transformer and appropriate relays mounted in box 44 are connected to terminal 42. An electrical control box 46 for the float switches 36, 38 and 40 is connected to the transformer box 44 and is preferably located as close as possible to the switch mechanisms which are in the reservoir. The control box 46 may also carry the high fluid level alarm, such as the light 48, to provide a warning whenever fluid in the reservoir reaches an upper safety limit and requires attention.

Fluid input into dissolver 10 is provided through water supply piping 50, which typically may be tipped with a three-eighths inch inlet copper tubing connector 52. Immediately adjacent the inlet connector 52, a Y-strainer 54 is provided to protect the dissolver system from extraneous foreign matter. A lower solenoid valve 56 is adjacent to strainer 54 and normally remains open while the dissolver is operating. In an emergency, however, this valve would close in order to stop water from entering the dissolver system. Above valve 56, as seen in FIGS. 1 and 2, the supply piping 50 includes a pressure regulator 58 and a pressure gauge 60 for monitoring the incoming fluid. Normally, such fluid is fresh make-up water flowing at a minimum of 45 psi and at about 0.9 gallons per minute maximum flow. Thereafter, in line 50, upper solenoid valve 62 is installed, connected to and controlled either by the lower level float control switch 38 which directs valve 62 to open and let water into the system, or by middle float switch 36 which directs valve 62 to close and prevent more water from coming into the system. In the unusual situation when a power loss occurs, upper solenoid valve 62 is closed in order to prevent the reservoir 24 from overflowing. Cables 64 and 66 connect the lower and upper solenoid valves, respectively, to the electrical control box 46.

Tubing 68 continues the fluid input of piping 50 to its connection with nozzle 30. In this manner a conduit is provided for a fluid under pressure to be sprayed against the solid chemical concentrate in the container 12. A vacuum breaker 70 is installed in the piping 50 adjacent the upper solenoid 62 in order to avoid any fluid back-up in the line.

Figure 3:
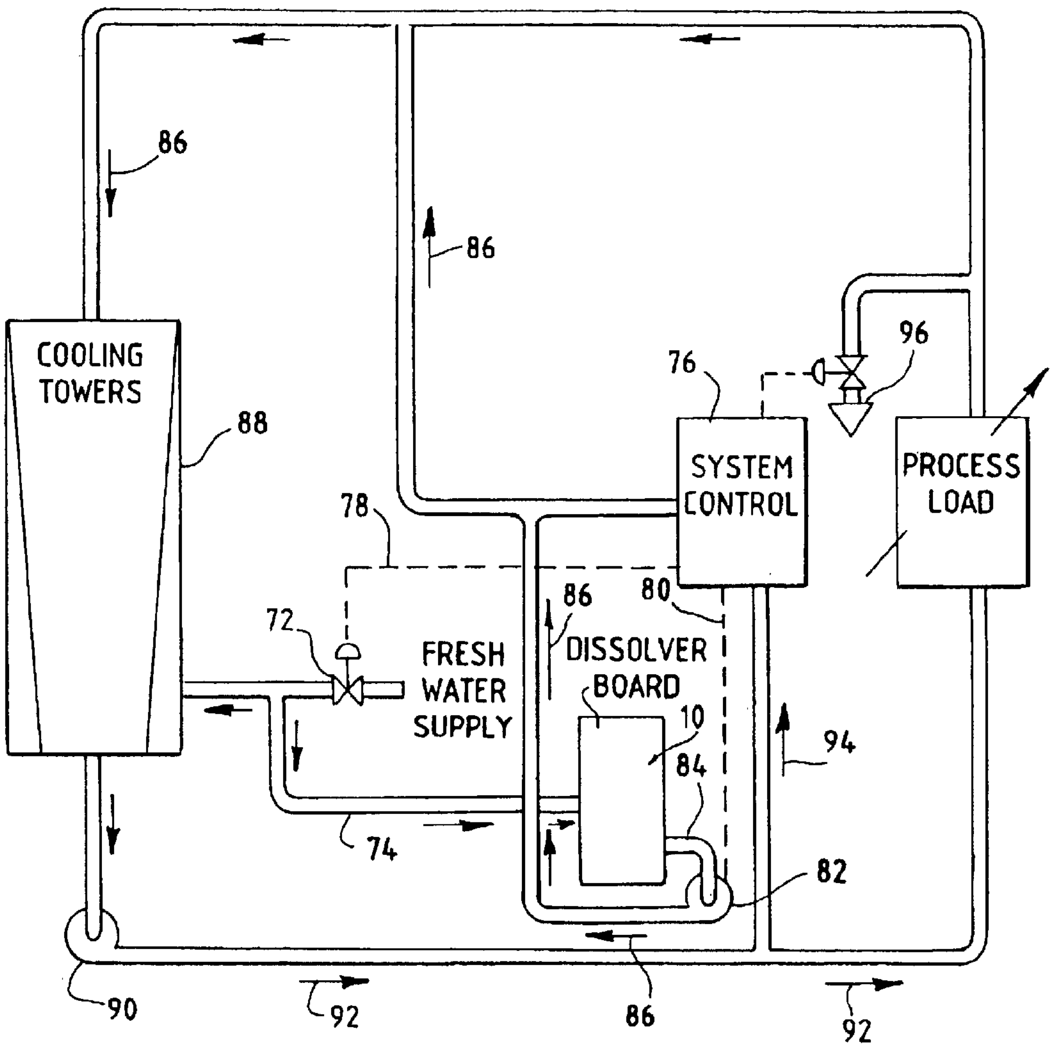
FIG. 3 is a schematic view of a system incorporating the form of solid chemical dissolver of FIG. 1 for circulating a solution containing the dissolved solid chemical in a cooling tower.
Figure 4:
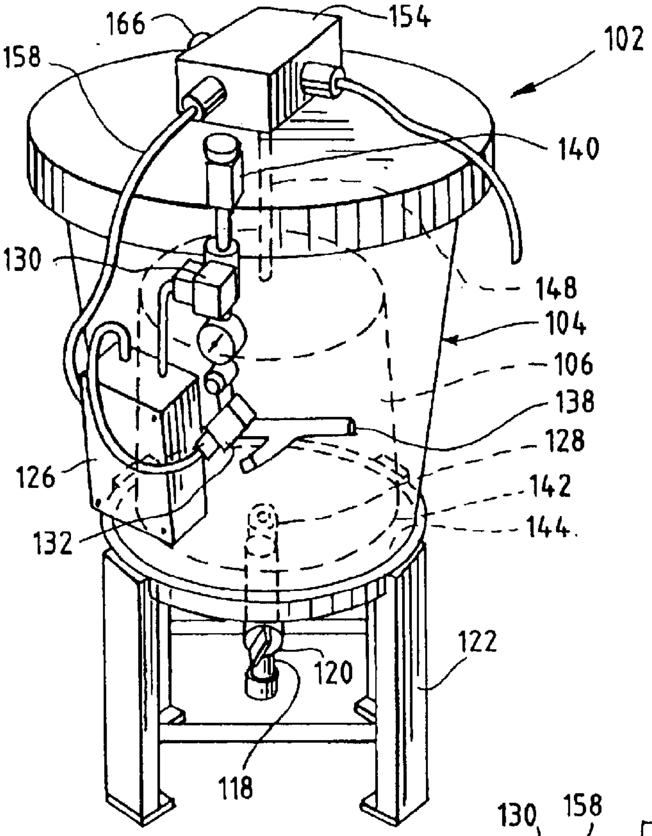
FIG. 4 is a perspective view of a second form of solid chemical dissolver embodying the present invention.
Figure 5:
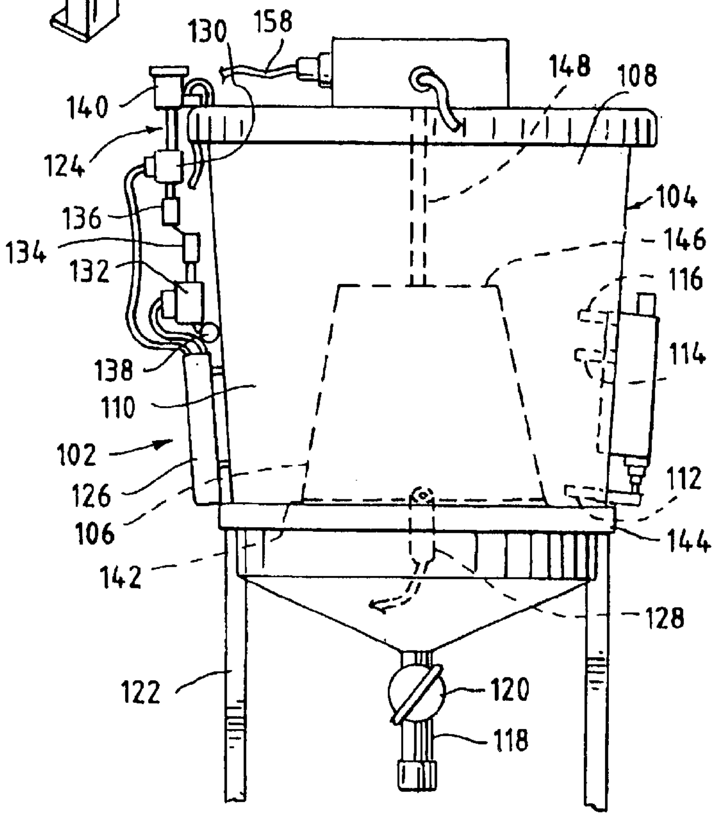
FIG. 5 is an elevational view of the solid chemical dissolver of FIG. 4.

The contribution which dissolver 10 makes in a chemical treatment process may be seen in the cooling tower treatment system illustrated in FIG. 3. A supply of fresh water is schematically represented at 72. The water brought in from the supply is led to the dissolver 10 through pipe 74. A fluid supply pipe 50, as described above, has a distal connective member 52 suitable for engaging the dissolver to a pipe such as 74. A system control, illustrated at 76, directs the input of fresh water to the dissolver 10 through line 78. Control 76 also directs the withdrawal of chemical solution created by the dissolver 10, by commands issued along line 80, to a chemical pump 82, the pump being connected to a discharge pipe 84 attached to a discharge piping member in dissolver 10 like piping 32.

Arrows 86 illustrate that pump 82 circulates chemical treatment solution to cooling tower 88. Then, after the solution is passed through the cooling tower 88, it is directed by pump 90 through a pipe in the direction of arrows 92 for recirculation or, as shown by arrow 94, for a withdrawal from the system, i.e., drained away at drain 96 and replaced by fresh water as directed by control 76.

To install dissolver 10, one may fasten it to a wall by using anchor screws (not shown) inserted into holes 98 in the corners of the frame 16. Dissolver 10 should be mounted as close as possible to the chemical pump 82. A user should provide a local shut-off valve in the water supply line leading to dissolver 10 (line 74 in FIG. 3) and use, preferably, three-eighths inch tubing to conveniently join into the inlet copper tubing connector 52. Normally, also, a three-eighths inch tubing fitting 100 is provided at the outer end of discharge piping 32 near the bottom of reservoir 24 which will connect conventionally with the discharge pipe 84 leading to chemical pump 82.

Assuming that the elements and sizes of parts just described have been adopted in assembling the board-mounted dissolver 10, the net weight of the dissolver on the board is about twenty-three pounds. Assuming further that a twelve and one half pound plastic pail of solid chemical concentrate is placed in bowl 14 and that the system has been run using clean make-up water so that the reservoir 24 is full of liquid solution, the water and chemical concentrate pail add about nineteen pounds and bring the total weight of the board-mounted dissolver of the present invention to about forty to forty-five pounds in use.

When dissolver 10 is first turned on (with valve 34 set in the open position), both the upper solenoid valve 62 and the lower solenoid valve 56 open to let water (running at at least 45 psi) into the system through water supply piping 50. The water runs through tubing 68 into nozzle 30 where it is sprayed against the solid chemical concentrate in the pail or container 12. The spray form a solution with some of the chemical by dissolving it in the spray, and the solution thus formed drains through pipe 28 into the reservoir 24. When the reservoir is filled to the point where the middle float switch is activated by the rising amount of fluid, switch 36 signals upper solenoid valve 62 to close, thereby shutting off further water until valve 62 is reactivated.

After the reservoir is filled, as described, pump 82 may be started so that it can draw chemical solution out of the reservoir through discharge pipe 32. As the solution is pumped out, the level of the solution in the reservoir drops until the lower, low level float switch 38 is activated by the solution level and commands the upper solenoid valve 62 to reopen. As before, incoming water is sprayed through nozzle 30 at the solid chemical concentrate in the pail or container 12 and dissolves some of it. The cycle continues then to repeat itself. However, if the upper solenoid valve 62 should stick, or if it should begin to leak and allow fluid to pass through without a command to open, the resulting extra fluid in reservoir 24 would activate the high level float switch 40, and that switch would send a command to lower solenoid valve 56 to close. No water would then be permitted to enter the system until the malfunction in the upper solenoid valve 62 was resolved. Notably, the connection between the high level float switch 40 and alarm light 48 would turn the light on in order to alert a system operator to the valve problem. Desirably, too, the upper solenoid valve 62 is programmed to close if a power outage should occur and thus prevent the reservoir from overflowing.

The embodiment of the present invention described above as dissolver 10 may be modified to adopt the form of dissolver 102 illustrated in FIGS. 4 through 7 which combines the bowl 14 and the reservoir 24 in a single container such as the can 104 illustrated in FIGS. 4 through 7. The can 104 may be as large as a small tank or vat. While the bowl 14 of dissolver 10 normally accepts a small pail 12 of solid concentrate, dissolver 102 is arranged to receive and dissolve an increased amount of solid concentrate from a larger pail or container (such as a jar) 106. The bowl 108 of dissolver 102, into which pail 106 is placed, is the upper portion of the can 104, while the reservoir 110, which stores the chemical concentrate solution as it is made and from which the chemical concentrate solution is withdrawn for treating equipment such as cooling towers, is in the lower portion of can 104. Lower, middle and upper float switches 112, 114 and 116, respectively, are positioned in the reservoir 110. Discharge piping 118, in which a PVC valve 120 is incorporated, depends from reservoir 110 for withdrawing the chemical concentrate solution. A frame 122 in the form of a stool supports can 104 and its associated piping, controls and contents.

A fluid inlet line 124, which includes piping and valves governed by control box 126, brings incoming fluid to nozzle 128 aimed at the solid concentrate in container 106. As was the case with dissolver 10, the nozzle 128 sprays the incoming fluid, normally fresh make-up water, at the face of the solid concentrate to dissolve it and form a solution. The solution thus formed collects in the reservoir portion of the can 104. Middle float switch 114 and lower float switch 112 direct the turning on and turning off of incoming fluid by controlling upper solenoid valve 130, and upper float switch 116 directs lower solenoid valve 132 to close the fluid inlet line 124 whenever the fluid level in the reservoir portion 110 of can 104 gets too high. Pressure regulator 134 and pressure gauge 136 monitor the fluid pressure in the fluid inlet line 124. A Y-strainer 138 maintains the integrity of the incoming fluid. A vacuum breaker 140 is also included in the inlet line to prevent back-ups.

Figure 6:
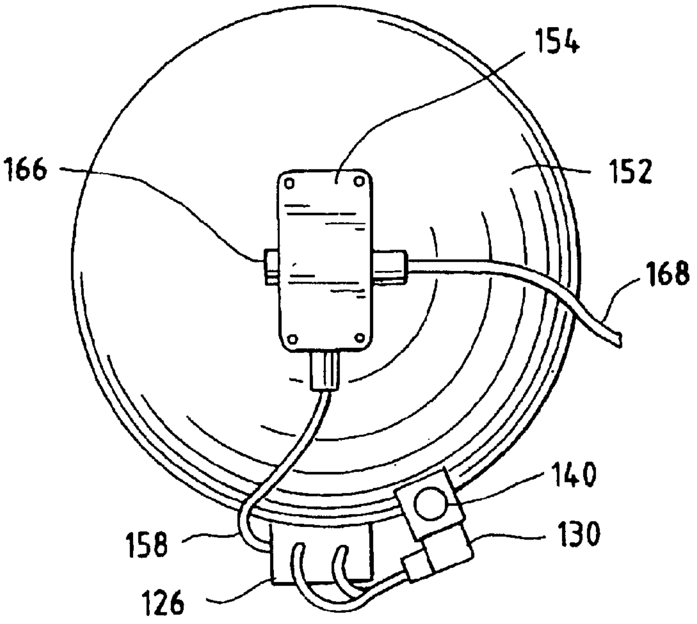
FIG. 6 is a top view, in perspective, of the solid chemical dissolver of FIG.4.
Figure 7:
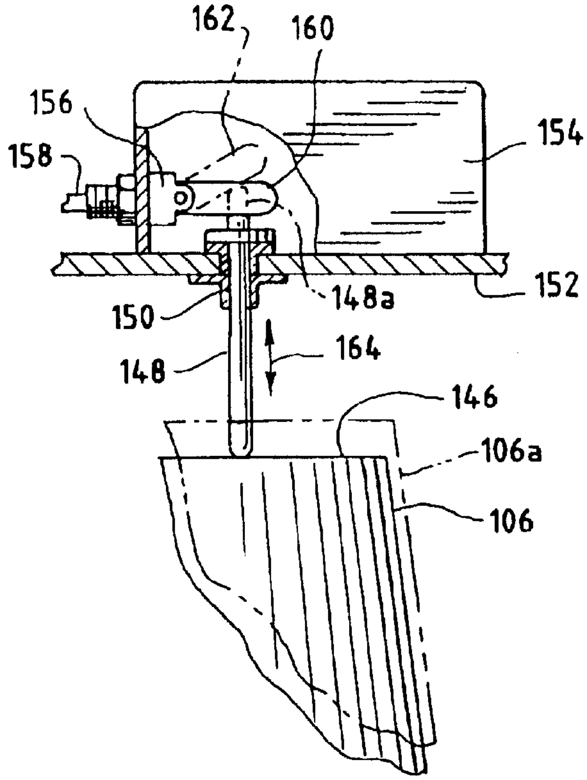
FIG. 7 is an enlarged perspective view, partially broken away, of a portion of the solid chemical dissolver of FIG. 4.

When the pail or jar or other container 106 is up-ended in can 104 so that its contents, the solid concentrate, face nozzle 128, the pail's rim 142 rests on a grate 144 nested in the reservoir portion 110 of can 104. In that position the bottom 146 of the pail faces upwardly. A plunger, rod 148, is arranged with its lower end resting on the pail bottom. The upper end of the plunger 148, as illustrated in FIGS. 6 and 7, is slideably mounted in a grommet 150 disposed in a lid 152 covering the upper end of can 104. An electrical box 154 on top of lid 152 carries a switch 156 connected to the lower solenoid valve 132 through cable 158 and control box 126. A trip member 160 on switch 156, which is moveable to the dotted line position 162, is normally disposed against the upper end or the plunger 148, and usually set in the "on" position shown in solid lines in FIG.7. When plunger 148 is moved upwardly, as indicated by the two-way arrow 164 in FIG. 7, switch 156 is tripped to the "off" position by the upper end of the plunger raising the trip member 160 to its dotted line position 162. When switch 156 is tripped in this manner, it commands the lower solenoid valve 132 to close and stop water from entering the system until the switch 156 is reset. The tripping of switch 156 to the "off" position also turns on a visual indicator, such as lamp 166, to alert an operator to the fact that the dissolver system has been shut off. An electrical power input cord 168 supplies power to box 154 for both the switch 156 and the lamp 166. The plunger 148 is moved to its dotted line position **148*a*, shown in FIG. 7, in the following manner. When the pail 106 is first set into can 104, ,it contains a quantity of solid chemical concentrate and assumes the solid line position shown at 106. After the fluid spray from nozzle 128 has dissolved all of the concentrate and the pail is empty, the remaining fluid in the reservoir buoys the pail upwardly, causing its bottom to lift the plunger to position 148*a***.

Figure 8:
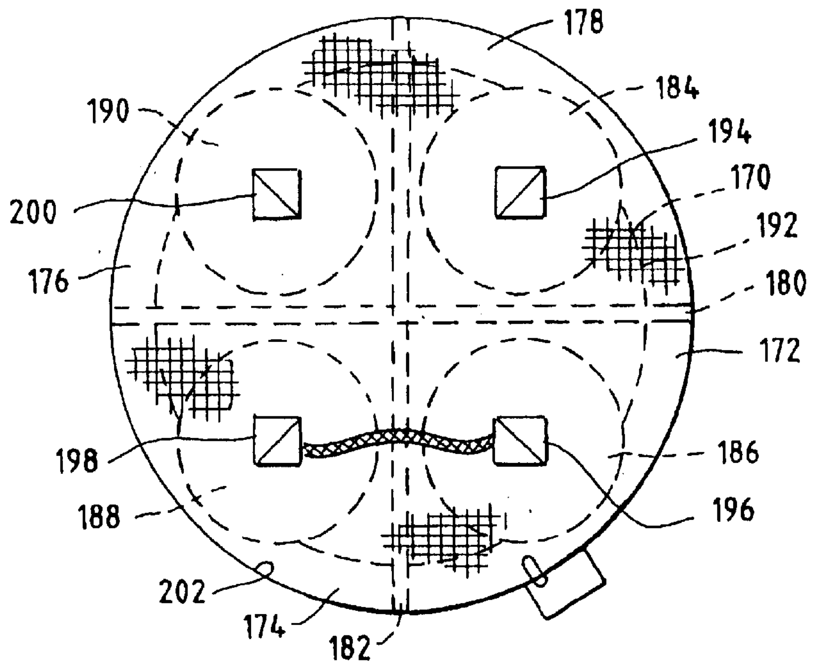
FIG. 8 is a top plan view of a third form of solid chemical dissolver embodying the present invention.

The embodiment of this invention shown in FIGS. 4 through 7 may be further modified, as shown in FIG. 8, to accommodate several smaller solid concentrate containers instead of the single container or pail 106. In the embodiment shown in FIG. 8, can or tank 170 is divided into four compartments 172, 174, 176 and 178 by partitions 180 and 182. Each compartment contains one of the up-ended containers or pails 184, 186, 188 and 190. The pails initially contain a solid chemical concentrate and their rims rest on a quadrant of grate 192. Each container is fed through its own solenoid valve and spray nozzle and is fitted with its own plunger. The plungers, which engage float switches 194, 196, 198 and 200 on lid 202, are activated in the manner described above when their respective pails become empty. In this embodiment, as each of the pails becomes empty, its float switch transfers the flow of water to the nozzle servicing the next full container. Visual indicators, such as the lamps described above, are lit at each emptied container so that an operator can replace them with filled ones. Normally such replacements occur, in the four pail unit, when three containers are empty and the system is in the process of emptying the last one.

Figure 9:
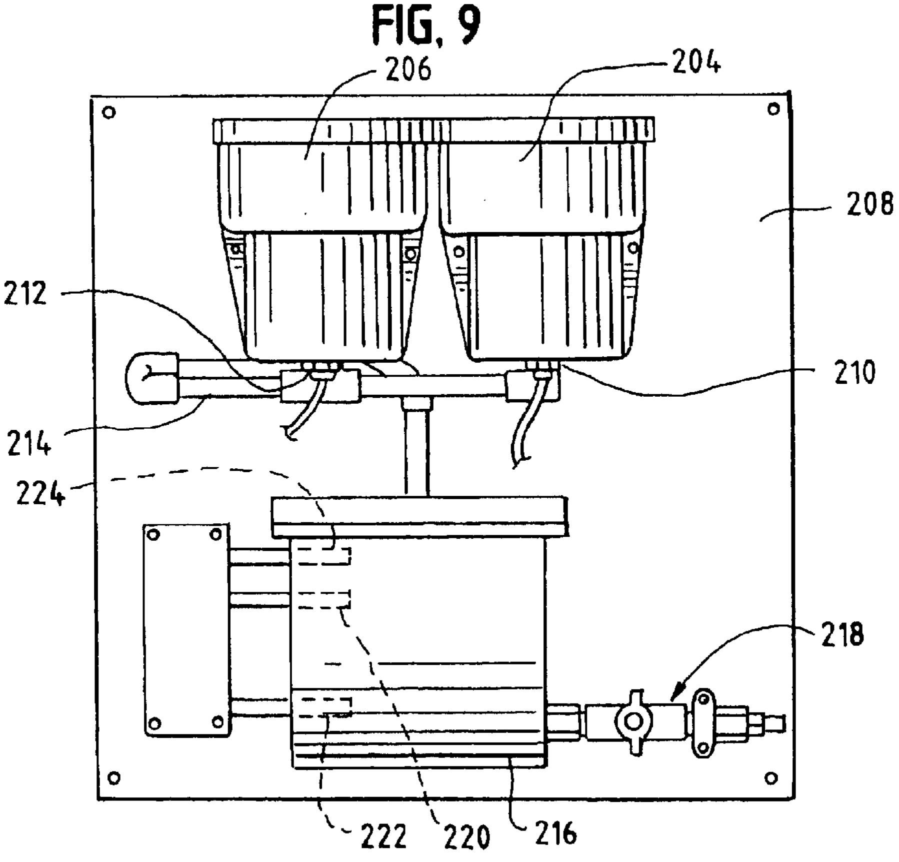
FIG. 9 is an elevational view of a fourth form of solid chemical dissolver embodying the present invention.

A further embodiment of this invention is shown in FIG. 9. The arrangement and function of the dissolver components illustrated in this figure is very similar to the arrangement and function of the components in dissolver 10. In the modification shown in FIG. 9, the bowls 204 and 206 are arranged side by side on a board 208. Each bowl is served by a nozzle, 210 for bowl 204 and 212 for bowl 206. Each bowl holds an inverted solid concentrate container into which the respective nozzles direct a spray. The bowls are operated in sequence and drain solution into discharge pipe 214 leading to reservoir 216. Solution is drawn from the reservoir through discharge piping 218 for use in cleaning a cooling tower or similar equipment. Middle float switch 220 and lower float switch 222 regulate the solution level in the reservoir, and upper float switch 224 protects against overflow. A fluid inlet line (not shown) contains all of the components similar to line 50 except that there are two upper solenoid valves, one for nozzle 210 and one for nozzle 212. The upper solenoid valves are interconnected and essentially operate in sequence, one after the other, to empty the pails of solid concentrate in the bowls served by their respective nozzles.

From all of the foregoing, it will be evident that although particular embodiments of the invention have been illustrated and described, nevertheless various modifications can be made without departing from the true spirit and scope of the invention. Accordingly, no limitation on the invention is intended by the foregoing descriptions of various embodiments, and the full breadth of the invention is intended to

I claim:

1. A solid chemical dissolver comprising at least one bowl for receiving and holding at least one container of solid chemical and for channeling a liquid solution containing the chemical to a reservoir as the solid chemical in the container is dissolved in a liquid spray, a spray nozzle for fluid under pressure aimed at the solid chemical in the container to dissolve a portion of the chemical in the spray and form a solution containing the chemical in the bowl, a reservoir for the dissolved solid chemical solution, a drain member leading out of the reservoir for withdrawing the dissolved chemical solution from the reservoir, and a fluid level detection switch assembly disposed in the reservoir controlling the amount of fluid from the nozzle and the level of dissolved chemical solution in the reservoir.

2. The dissolver of claim 1 in which the fluid level detection switch assembly includes a float switch connected to a fluid inlet valve for closing the valve when the fluid level in the reservoir activates the switch.

3. The dissolver of claim 1 in which the fluid level detection switch assembly includes a float switch connected to a fluid inlet valve for opening the valve when the fluid level in the reservoir activates the switch.

4. The dissolver of claim 1 in which the fluid level detection switch assembly includes a first switch element for closing a first fluid inlet valve when the fluid level in the reservoir activates the first switch element, a second switch element for opening the first fluid inlet valve when the fluid level in the reservoir activates the second switch element, and a third switch element connected to a second fluid inlet valve intermediate the first fluid inlet valve and the reservoir for closing the second fluid inlet valve and blocking fluid from entering the reservoir whenever the fluid level in the reservoir activates the third switch element.

5. The dissolver of claim 2 in which the fluid inlet valve is mounted in a fluid supply pipe adjacent to the reservoir.

6. The dissolver of claim 4 which includes a fluid supply pipe adjacent to the reservoir and the first and second fluid inlet valves are disposed in the fluid supply pipe.

7. The dissolver of claim 4 which includes a signal element connected to the third switch element to display closure of the second fluid inlet valve.

8. The dissolver of claim 1 which includes a frame on which the bowl and the reservoir are mounted.

9. The dissolver of claim 8 which includes first and second valve elements in a fluid supply pipe disposed on the frame.

10. The dissolver of claim 1 which includes at least one bowl in which a plurality of solid chemical containers are held.

11. The dissolver of claim 1 which includes a drain member leading from the bowl to the reservoir to conduct the dissolved chemical solution from the bowl to the reservoir.

12. The dissolver of claim 1 in which the bowl and the reservoir are combined in a common canister.

13. The dissolver of claim 12 which includes a fluid inlet valve incorporated in a fluid supply pipe disposed on a wall of the canister.

14. The dissolver of claim 13 which includes a switch element connected to a second fluid inlet valve incorporated in the fluid supply pipe, the second valve being moveable to a closed position in the supply pipe to block fluid from entering the reservoir from the pipe whenever the fluid level in the reservoir activates the switch element.

15. The dissolver of claim 12 which includes an alarm switch having an activating arm in the canister adjacent the solid chemical container, the arm being moveable to activate the alarm switch whenever the chemical container is buoyed against the arm inside the canister.

* * * * *